(12) United States Patent
Rivard et al.

(10) Patent No.: US 11,252,589 B2
(45) Date of Patent: *Feb. 15, 2022

(54) SYSTEM AND METHOD FOR SHARING DATA BASED ON A COMBINED BANDWIDTH CONSUMPTION

(71) Applicant: Duelight LLC, Sunnyvale, CA (US)

(72) Inventors: William Rivard, Menlo Park, CA (US); Brian Kindle, Sunnyvale, CA (US); Adam Feder, Mountain View, CA (US)

(73) Assignee: DUELIGHT LLC, Sunnyvale, CA (US)

(*) Notice: Subject to any disclaimer, the term of this patent is extended or adjusted under 35 U.S.C. 154(b) by 33 days.

This patent is subject to a terminal disclaimer.

(21) Appl. No.: 16/666,215

(22) Filed: Oct. 28, 2019

(65) Prior Publication Data

US 2020/0059806 A1 Feb. 20, 2020

Related U.S. Application Data

(63) Continuation of application No. 15/975,646, filed on May 9, 2018, now Pat. No. 10,506,463, which is a continuation of application No. 14/547,079, filed on Nov. 18, 2014, now Pat. No. 9,998,935.

(51) Int. Cl.
*H04W 28/20* (2009.01)
*H04W 24/08* (2009.01)
*H04W 4/70* (2018.01)

(52) U.S. Cl.
CPC .............. *H04W 24/08* (2013.01); *H04W 4/70* (2018.02); *H04W 28/20* (2013.01)

(58) Field of Classification Search
CPC ....................................................... H04L 12/28
USPC .......................................................... 370/400
See application file for complete search history.

(56) References Cited

U.S. PATENT DOCUMENTS

| | | | |
|---|---|---|---|
| 6,760,748 | B1 | 7/2004 | Hakim |
| 9,232,173 | B1 | 1/2016 | Duggal et al. |
| 9,560,269 | B2 | 1/2017 | Baldwin |
| 9,998,935 | B2 | 6/2018 | Rivard et al. |
| 10,506,463 | B2 | 12/2019 | Rivard et al. |
| 2010/0115605 | A1 | 5/2010 | Beattie et al. |
| 2016/0143040 | A1 | 5/2016 | Rivard et al. |
| 2016/0248968 | A1 | 8/2016 | Baldwin |
| 2017/0048442 | A1 | 2/2017 | Cote et al. |

(Continued)

OTHER PUBLICATIONS

Rivard et al., U.S. Appl. No. 14/547,079, filed Nov. 18, 2014.

(Continued)

*Primary Examiner* — Dang T Ton
(74) *Attorney, Agent, or Firm* — Zilka-Kotab, P.C.

(57) ABSTRACT

A system, method, and computer program product are provided for sharing data based on an adjusted bandwidth consumption. In use, a first sharing action is received by a network carrier system by a first device for one or more data items. Additionally, it is determined, by the network carrier system, that the first sharing action satisfies an exclusion criteria. The first sharing action is performed by the network carrier system, where the first sharing action comprises streaming the one or more data items to the first device, and data transmitted to the first device in connection with the first sharing action is excluded from a data plan usage calculated by the network carrier system for the first device.

20 Claims, 11 Drawing Sheets

(56) References Cited

U.S. PATENT DOCUMENTS

2018/0262934 A1    9/2018  Rivard et al.
2020/0092596 A1*   3/2020  Moore, Jr. ......... H04N 21/4788

OTHER PUBLICATIONS

Non-Final Office Action from U.S. Appl. No. 14/547,079, dated Nov. 7, 2016.
Non-Final Office Action from U.S. Appl. No. 14/547,079, dated Mar. 15, 2017.
Final Office Action from U.S. Appl. No. 14/547,079, dated Jul. 17, 2017.
Non-Final Office Action from U.S. Appl. No. 14/547,079, dated Nov. 9, 2017.
Notice of Allowance from U.S. Appl. No. 14/547,079, dated May 3, 2018.
Rivard et al., U.S. Appl. No. 15/975,646, filed May 9, 2018.
Non-Final Office Action from U.S. Appl. No. 15/975,646, dated Sep. 27, 2018.
Final Office Action from U.S. Appl. No. 15/975,646, dated Mar. 25, 2019.
Advisory Action from U.S. Appl. No. 15/975,646, dated Apr. 23, 2019.
Notice of Allowance from U.S. Appl. No. 15/975,646, dated Aug. 9, 2019.

* cited by examiner

SYSTEM AND METHOD FOR SHARING DATA BASED ON A COMBINED BANDWIDTH CONSUMPTION

RELATED APPLICATIONS

This application is a continuation of and claims priority to U.S. patent application Ser. No. 15/975,646, filed May 9, 2018, entitled "SYSTEM AND METHOD FOR SHARING DATA BASED ON A COMBINED BANDWIDTH CONSUMPTION," which in turn is a continuation of and claims priority to U.S. patent application Ser. No. 14/547,079, filed Nov. 18, 2014, entitled "SYSTEM AND METHOD FOR SHARING DATA BASED ON A COMBINED BANDWIDTH CONSUMPTION," issued as U.S. Pat. No. 9,998,935, the contents of each incorporated by reference herein for all purposes.

FIELD OF THE INVENTION

The present invention relates to sharing data, and more particularly to sharing data based on a combined bandwidth consumption.

BACKGROUND

Traditional mobile computing systems are limited by one or more data transmission limits associated with total bandwidth consumption. For example, a user's mobile account may be associated with an allocated bandwidth consumption amount. Further, bandwidth consumption amounts may now be shared amongst more than one device. However, use of the allocated bandwidth amongst more than one device can potentially be exceeded and be inaccurately tracked at each device. As such, there is thus a need for addressing these and/or other issues associated with the prior art.

SUMMARY

A system, method, and computer program product are provided for sharing data based on an adjusted bandwidth consumption. In use, a first sharing action is received by a network carrier system by a first device for one or more data items. Additionally, it is determined, by the network carrier system, that the first sharing action satisfies an exclusion criteria. The first sharing action is performed by the network carrier system, where the first sharing action comprises streaming the one or more data items to the first device, and data transmitted to the first device in connection with the first sharing action is excluded from a data plan usage calculated by the network carrier system for the first device.

DETAILED DESCRIPTION

Figure 1:
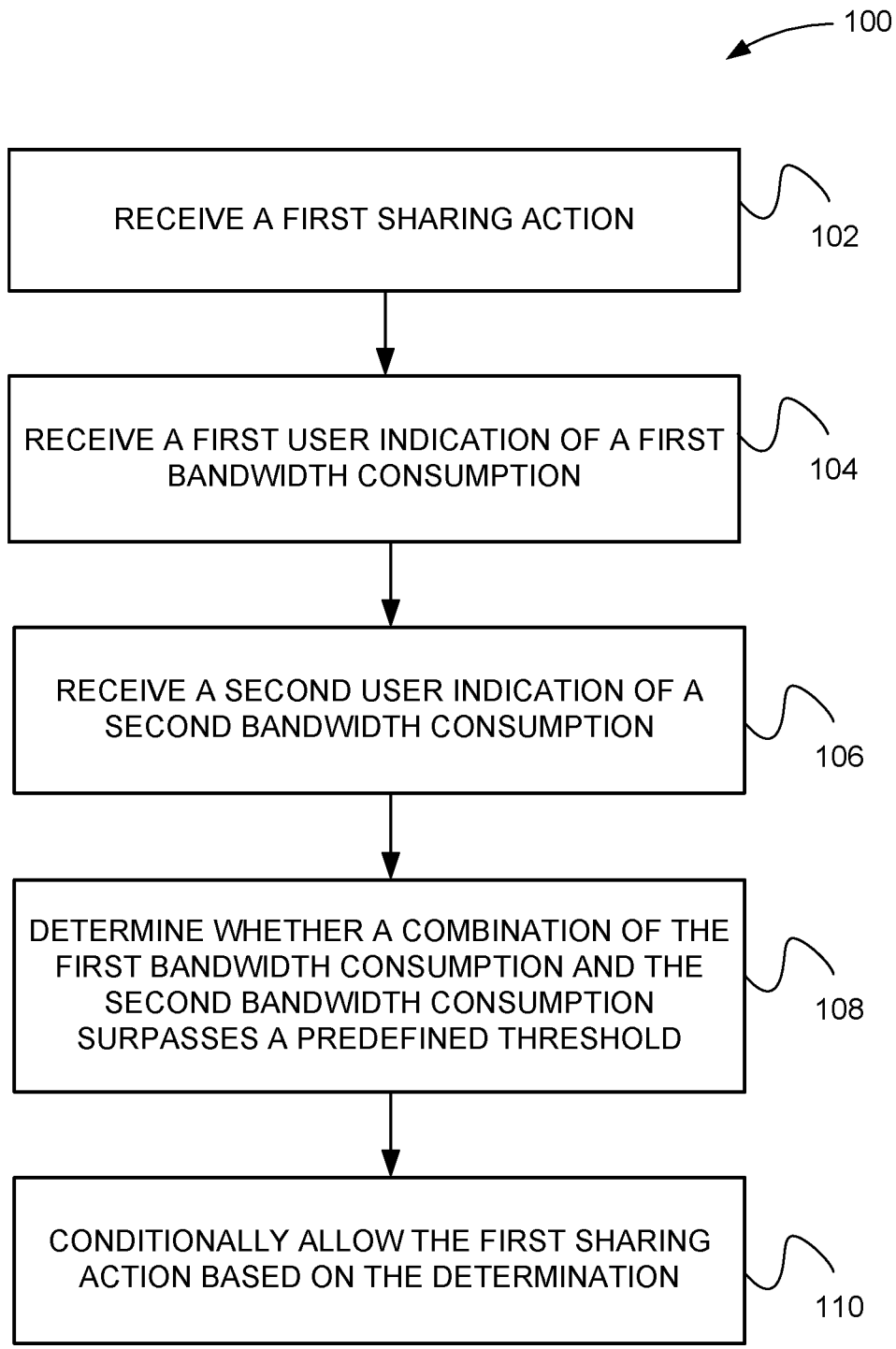
FIG. 1 shows a method for sharing data based on a combined bandwidth consumption, in accordance with one embodiment.

FIG. 1 shows a method 100 for sharing data based on a combined bandwidth consumption, in accordance with one embodiment. As an option, the method 100 may be implemented in the context of the details of any of the Figures. Of course, however, the method 100 may be carried out in any desired environment. Further, the aforementioned definitions may equally apply to the description below.

As shown, a first sharing action is received. See operation 102. Next, a first user indication of a first bandwidth consumption is received. See operation 104. Further, a second user indication of a second bandwidth consumption is received. See operation 106.

In the context of the present description, a sharing action includes any action to share data in some manner. For example, in various embodiments, sharing action may include an action to transfer data from one client to another client, from a client to a server, from a server to a client, within a network, from a network to a second network, to the cloud, etc.

Additionally, in the context of the present description, bandwidth consumption is an amount of data conveyed through one or more networks (in other words, "used" or "consumed"). For example, in one embodiment, a user may have a wireless data connection provided as part of a data service plan associated with a mobile network carrier, and the user may transmit and/or receive data through the mobile network carrier, thereby consuming bandwidth against a data allocation specified in the data service plan. Bandwidth may be consumed by one or more sharing actions. In one embodiment, the first bandwidth consumption may comprise an amount of bandwidth consumed against a data allocation associated with a wireless data service (e.g. bandwidth consumed through a mobile network carrier), while the second bandwidth consumption may comprise an amount of data associated with performing an action, such the one or more sharing actions.

In one embodiment, the indication of the first bandwidth consumption may be received from a network carrier. For example, in one embodiment, the amount of data a user has used may be indicated by the mobile carrier. The second bandwidth consumption may be received by an application or sharing module executing within a client (e.g. a mobile device) that determines total data transmission requirements for a sharing action. In another embodiment, the first bandwidth consumption may be received from a peer-to-peer network usage tracking system or usage counter. For example, in one embodiment, each device among a collection of devices (e.g. on a shared data plan, etc.) may track individual data consumption for the device, and subsequently update other devices within the collection of devices with the individual data consumption information. With each device receiving individual data consumption information from all other devices within the collection of devices (e.g. on a shared data plan, etc.), collective consumption may be known to each device. A value for collective consumption may be determined by adding device consumption associated with individual data consumption information. In one embodiment, the value for collective consumption indicates a total amount of bandwidth consumed over all devices within a shared data plan.

In another embodiment, one or more usage parameters comprising the first bandwidth consumption may be received from a peer-to-peer network, and the peer-to-peer network may periodically receive updates from a network carrier regarding the first bandwidth consumption. For example, in one embodiment, each client in a collection of devices (e.g., on a shared data plan, etc.) may track device usage and share the device usage information with other devices within the collection of devices. In this way, each device within the collection of devices has complete device usage information for the whole collection of devices, and therefore total plan consumption. In one usage scenario, each device registered to a shared data plan is able to report total plan usage to a corresponding user by combining device usage values for devices registered to the shared data plan. Additionally, in certain embodiments, the total amount of bandwidth consumed (as locally reported and saved on each device) may be cross-checked with a network carrier to ensure that the total amount as determined by the devices is within a set range (e.g. within a few percentage points of difference, etc.). If the total amount is not within a set range, then the total amount (as saved by each of the devices) may be updated by the network carrier to reflect the latest total amount.

In one embodiment, a network carrier may provide the first user indication of the first bandwidth consumption in response to a query of usage associated with a first user. Additionally, the network carrier may provide the second user indication of the second bandwidth consumption in response to a query of usage associated with a potential sharing action. For example, in one embodiment, a network carrier may verify an account associated with a user to determine how much bandwidth has been consumed by that user (or collection of users/devices, etc.).

In one embodiment, each device within the collection of devices executes a background process that performs updates to a locally cached value for the first bandwidth consumption when the device is within a covered service area. For example, each device may perform a periodic (e.g. every ten minutes) update to the locally cached value of the first bandwidth consumption. In other embodiments, each device may query a network carrier data management system (e.g. an accounting system) to retrieve the first bandwidth consumption for an associated shared data plan. Still yet, in one embodiment, the first bandwidth consumption may reflect actual bandwidth consumption as calculated by a network carrier. Additionally, in another embodiment, the peer-to-peer network may provide individual data consumption information from all devices to each device associated with a shared data plan, thereby allowing each device to locally calculate the first bandwidth consumption for the shared data plan.

As shown, it is determined whether a combination of the first bandwidth consumption and the second bandwidth consumption surpasses a predefined threshold. See operation 108. Lastly, the first sharing action is conditionally allowed based on the determination. See operation 110.

In one embodiment, a predefined threshold may be a data limit (e.g. imposed by a network carrier, etc.). For example, the predefined threshold may be defined by a data plan total limit, or a limit associated with a per user portion of a data plan total limit. In another embodiment, if the predefined threshold is surpassed, the first sharing action may be denied or postponed pending user approval. For example, in one embodiment, if a user wants to upload a 100 MB collection of photos, and doing so would surpass a predefined threshold, then the upload would be denied or, alternatively, the user would need to confirm their decision to exceed the predefined threshold and optionally purchase an additional allocation of data. For example, in one embodiment, the predefined threshold may be reconfigured, including, for example, adding additional money and/or an additional bandwidth amount to a user's account. In such an embodiment, the predefined threshold may be adjusted. In one embodiment, the user may purchase an additional bandwidth amount for their exclusive use. Alternatively, the user may purchase an additional bandwidth amount to be shared among all users registered to the same account. Still yet, in one embodiment, the adjustment may include purchasing additional bandwidth associated with the shared account (or any account). In another embodiment, if the predefined threshold is not surpassed, the first sharing action may be fully allowed.

Further, in another embodiment, specific types of data may be excluded from measuring the first bandwidth consumption and the second bandwidth consumption. For example, in one embodiment, data associated with music, video, photos, and/or a device app may be excluded from data consumption associated with a user. In certain embodiments, music, videos, photos, or other content associated with a preferred service may be excluded from measuring the first bandwidth, but music, videos, photos, or other content from a non-preferred service may be included in measuring the first bandwidth. In one embodiment, a network carrier may track all data, but only specific types of data may be counted with respect to a predefined threshold.

In one embodiment, the conditionally allowing may depend on an effect of the first sharing action. Additionally, in one embodiment, the effect may include a total amount of bandwidth utilized as a result or potential result of the first sharing action. In a further embodiment, the first bandwidth consumption, the second bandwidth consumption, and the effect may be summed to determine whether the predefined threshold is surpassed. Moreover, the predefined threshold may be associated with a predefined limit associated with a first account, such as an account associated with a shared data plan.

For example, in one embodiment, an effect of the first sharing action may include transferring data which may exceed a predetermined threshold. Because the effect would exceed a predetermined threshold, the first sharing action may be denied or postponed pending user approval.

Figure 2:
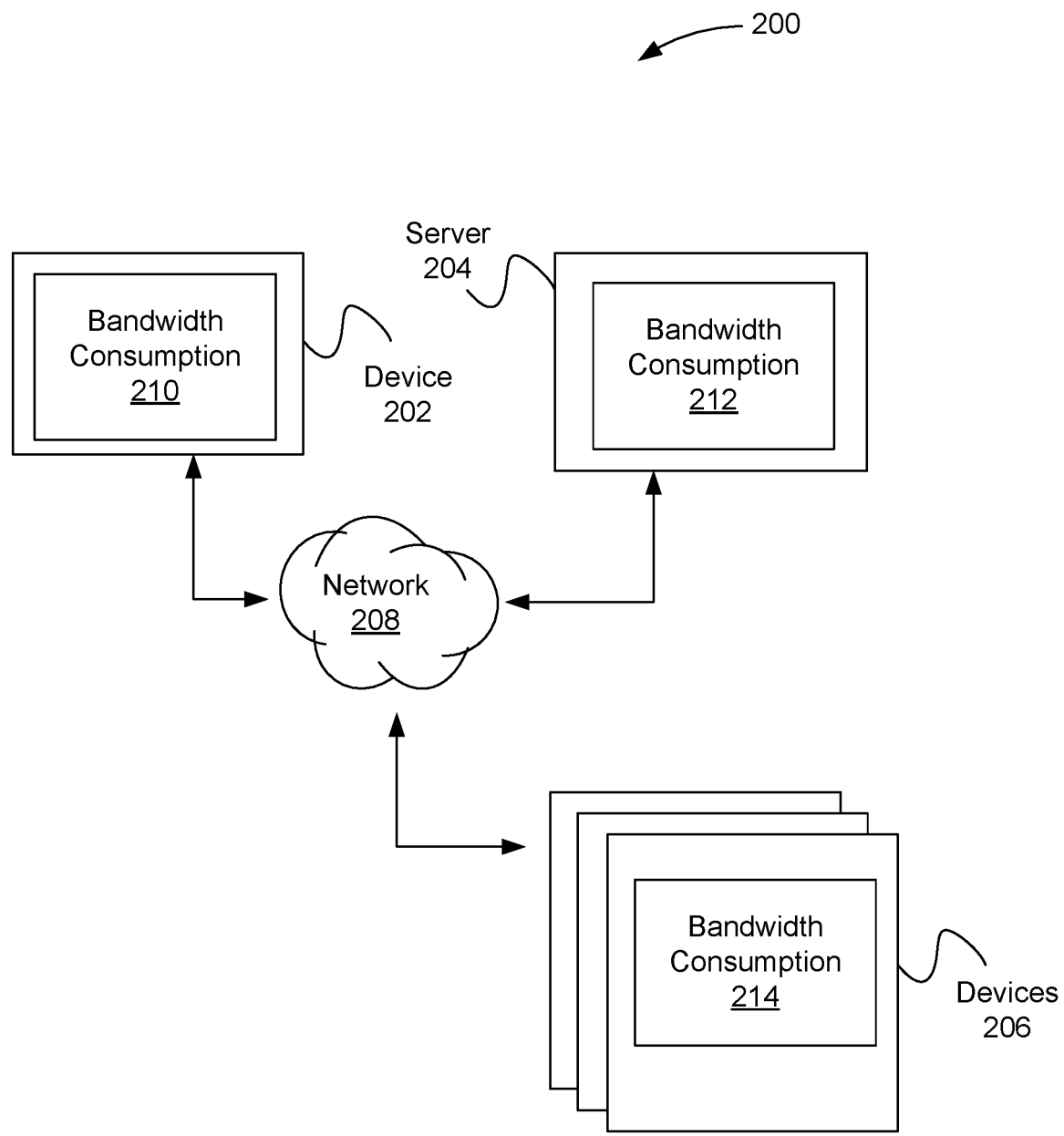
FIG. 2 shows a system for sharing data based on a combined bandwidth consumption, in accordance with one embodiment.

FIG. 2 shows a system 200 for sharing data based on a combined bandwidth consumption, in accordance with one embodiment. As an option, the system 200 may be implemented in the context of the details of any of the Figures. Of course, however, the system 200 may be carried out in any desired environment. Further, the aforementioned definitions may equally apply to the description below.

As shown, system 200 may include device 202, server 204, devices 206, and a network 208. In various embodiments, device 202 and devices 206 may include any device capable of transmitting data via a network system (e.g. mobile phone, tablet, desktop computer, etc.). In one embodiment, the device 202 may include a bandwidth consumption 210, and the devices 206 may include a bandwidth consumption 214. Further, the server 204 may include a bandwidth consumption 212.

In one embodiment, the server 204 may monitor data usage for all devices for an account. The account may include device 202 and any number of additional devices, shown as devices 206. As an example, the device 202 and at least one other device may be part of a single account plan with a shared data plan. In such an embodiment, the server 204 may track the bandwidth consumed for the device 202 and the at least one other device. Such tracking may be contained in bandwidth consumption 212.

In another embodiment, the device 202 may track its own data usage, shown as bandwidth consumption 210, and each of the other devices 206 may track their own data usage, shown as bandwidth consumption 214. In such an embodiment, the bandwidth consumption 210 and the bandwidth consumption 214 may be syncrhonized between the device 202 and devices 206 such that the device 202 and the devices 206 retain an up-to-date indication of the data usage for each of the devices individually and collectively. In such an embodiment, the device 202 or the devices 206 may periodically verify the collective data usage (e.g. for device 202 and devices 206, etc.) with the bandwidth consumption 212 of server 204. In this manner, the device 202 and devices 206 may keep an accurate recording of the collective bandwidth usage for all devices on an account.

In a separate embodiment, data usage may be tracked solely by device 202 and devices 206. However, in such an embodiment, the collective bandwidth consumption may not reflect the network carrier's data usage. For example, in one embodiment, a network carrier may not track usage for a specific type of data transfer (e.g. use of Pandora music, etc.). In another embodiment, header data and/or other packet data may be counted in a different manner by the network carrier (and/or may not even be detected by mobile device data usage counters, etc.). As such, a periodic update to a server (e.g. network carrier database, etc.) may assist in retaining accurate indications of bandwidth consumed.

In one embodiment, the need to determine bandwidth consumption may be triggered by a user initiating a sharing action which requires some amount of bandwidth consumption. For example, in one embodiment, a user may upload a photo, stream a video, chat, and/or consume data in any manner.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
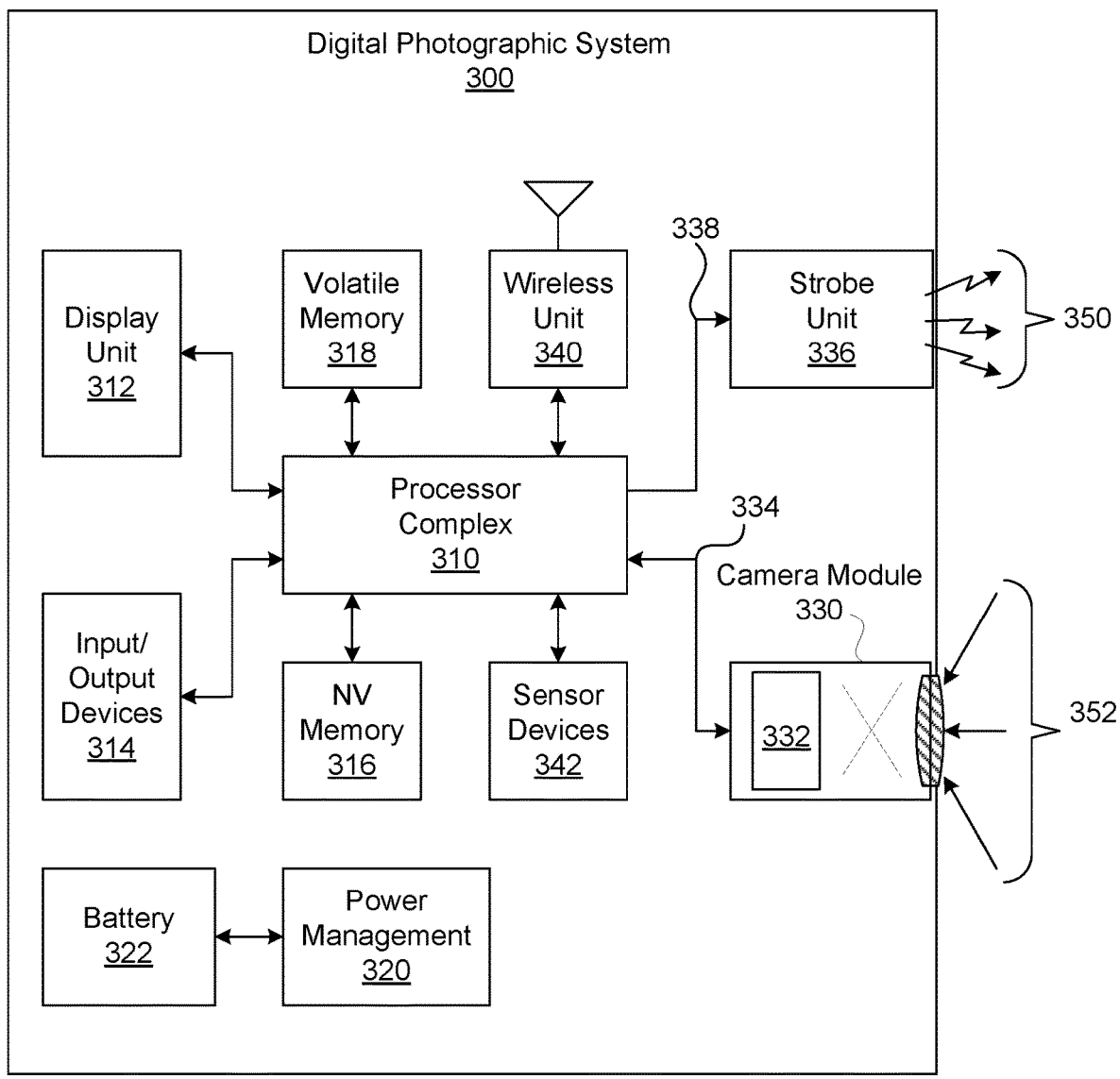
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.).

The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
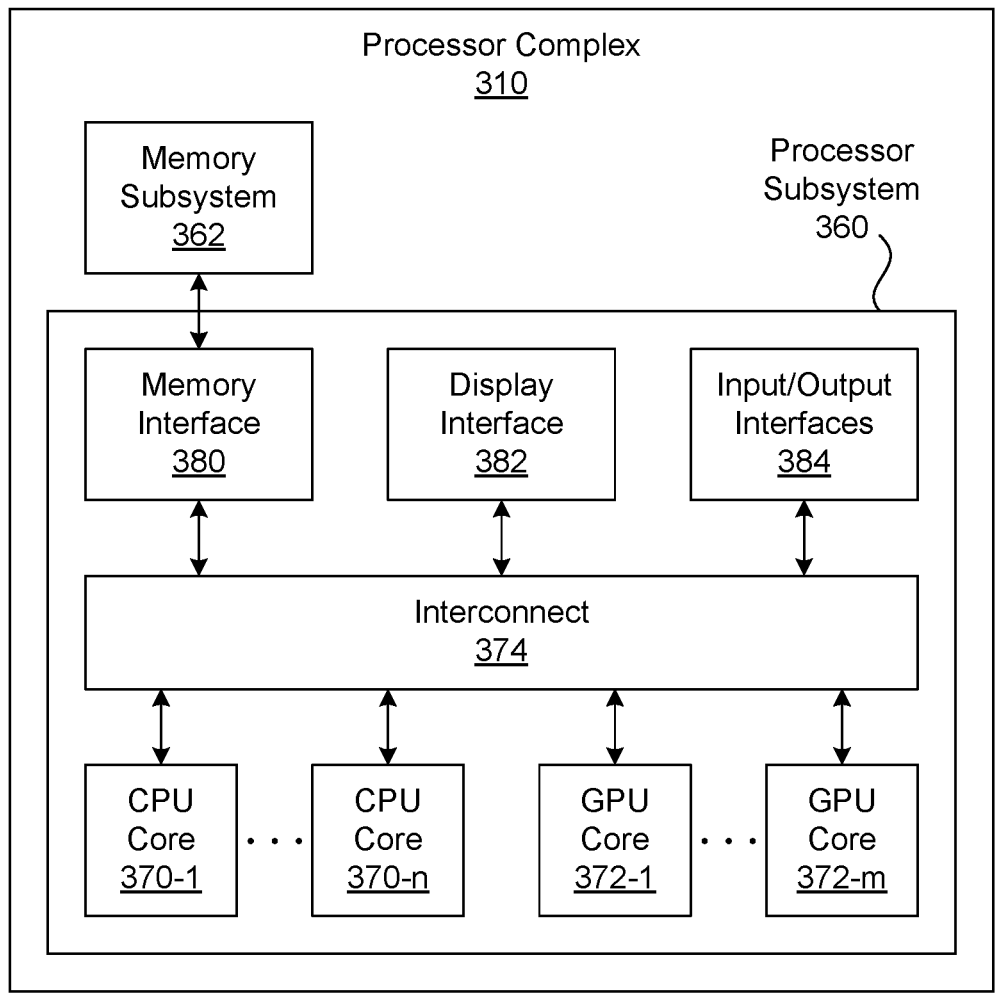
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
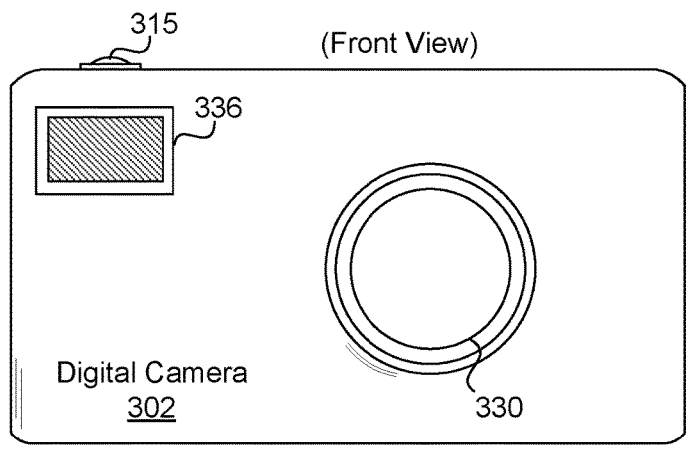
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
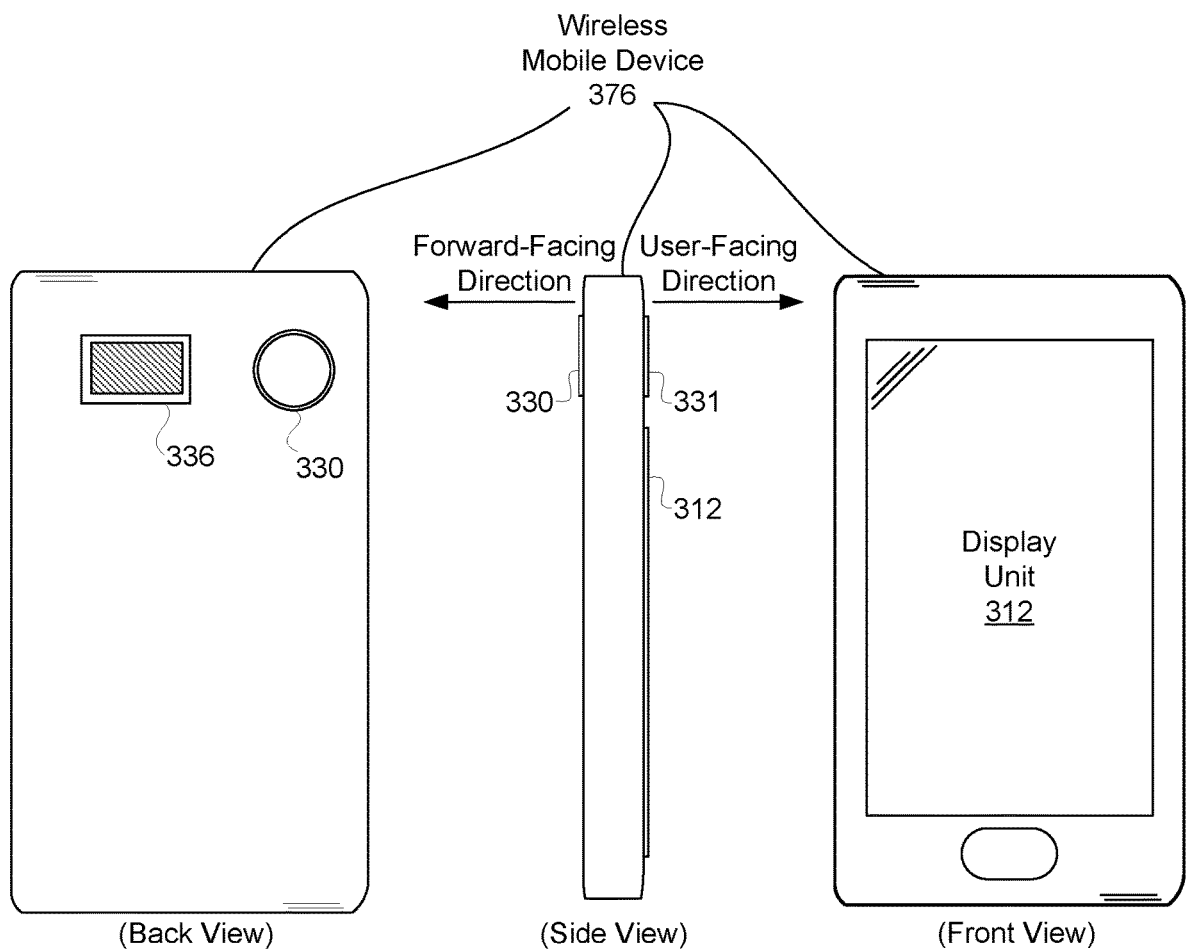
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
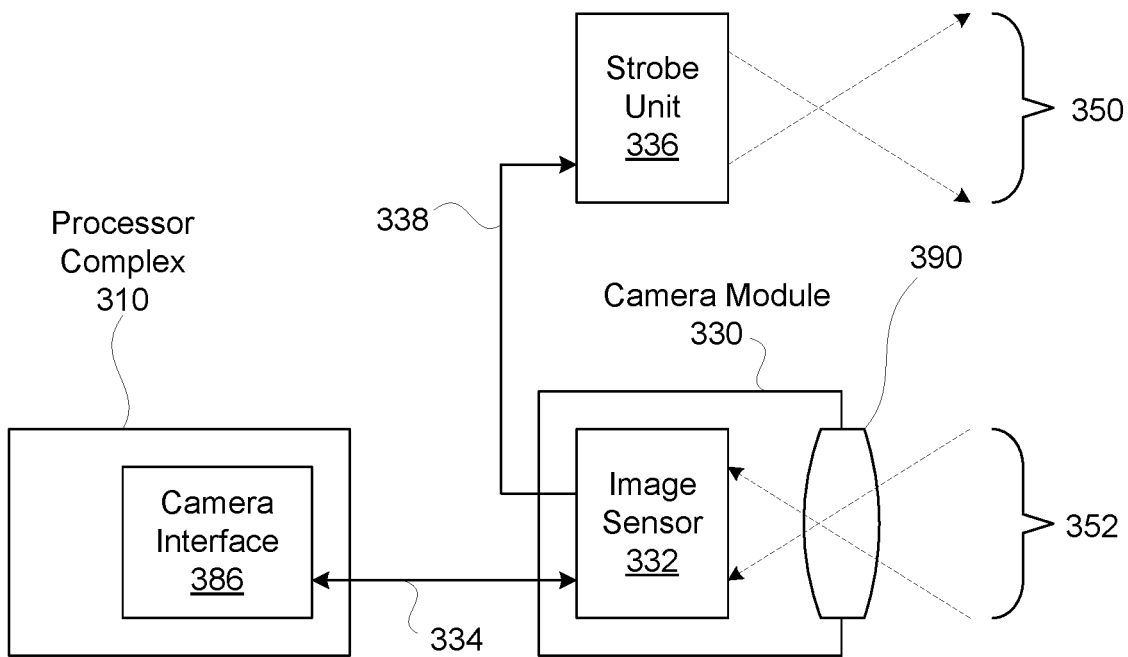
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
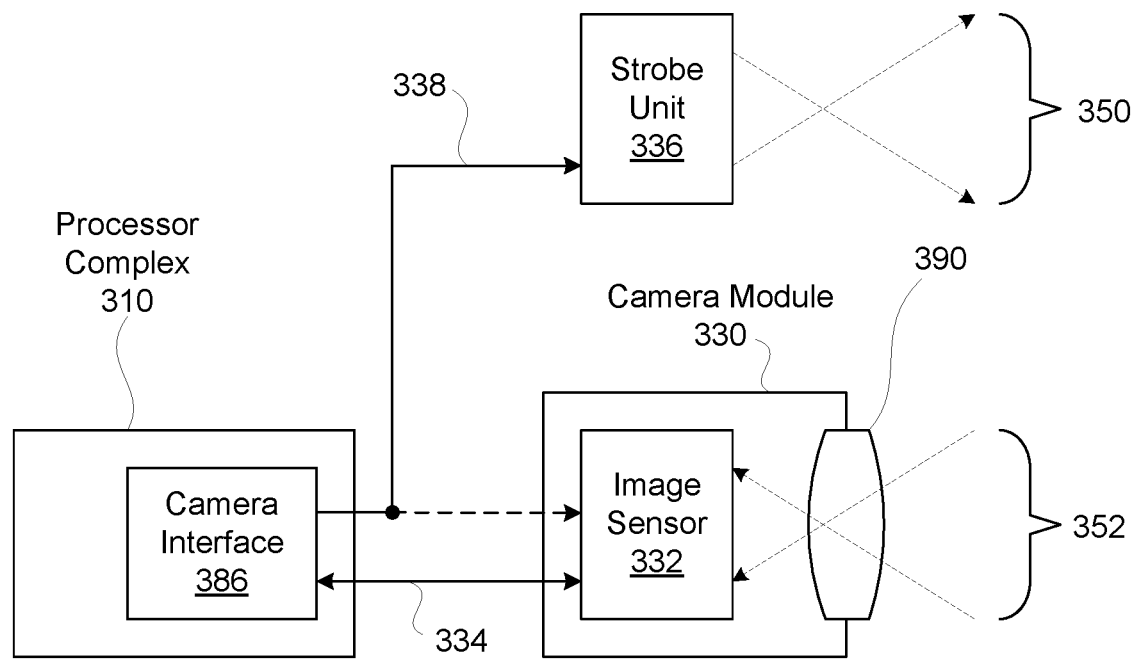
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
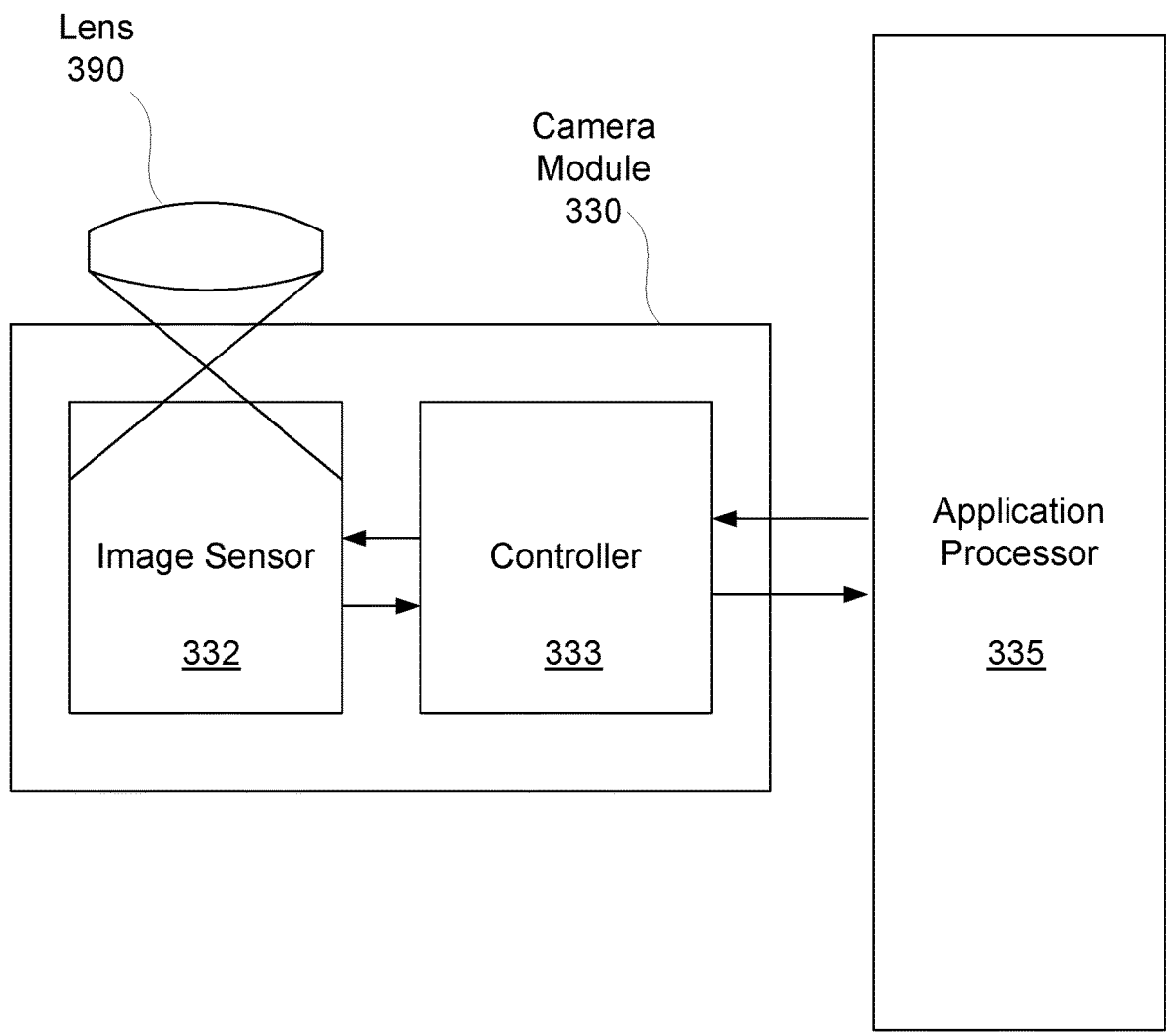
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
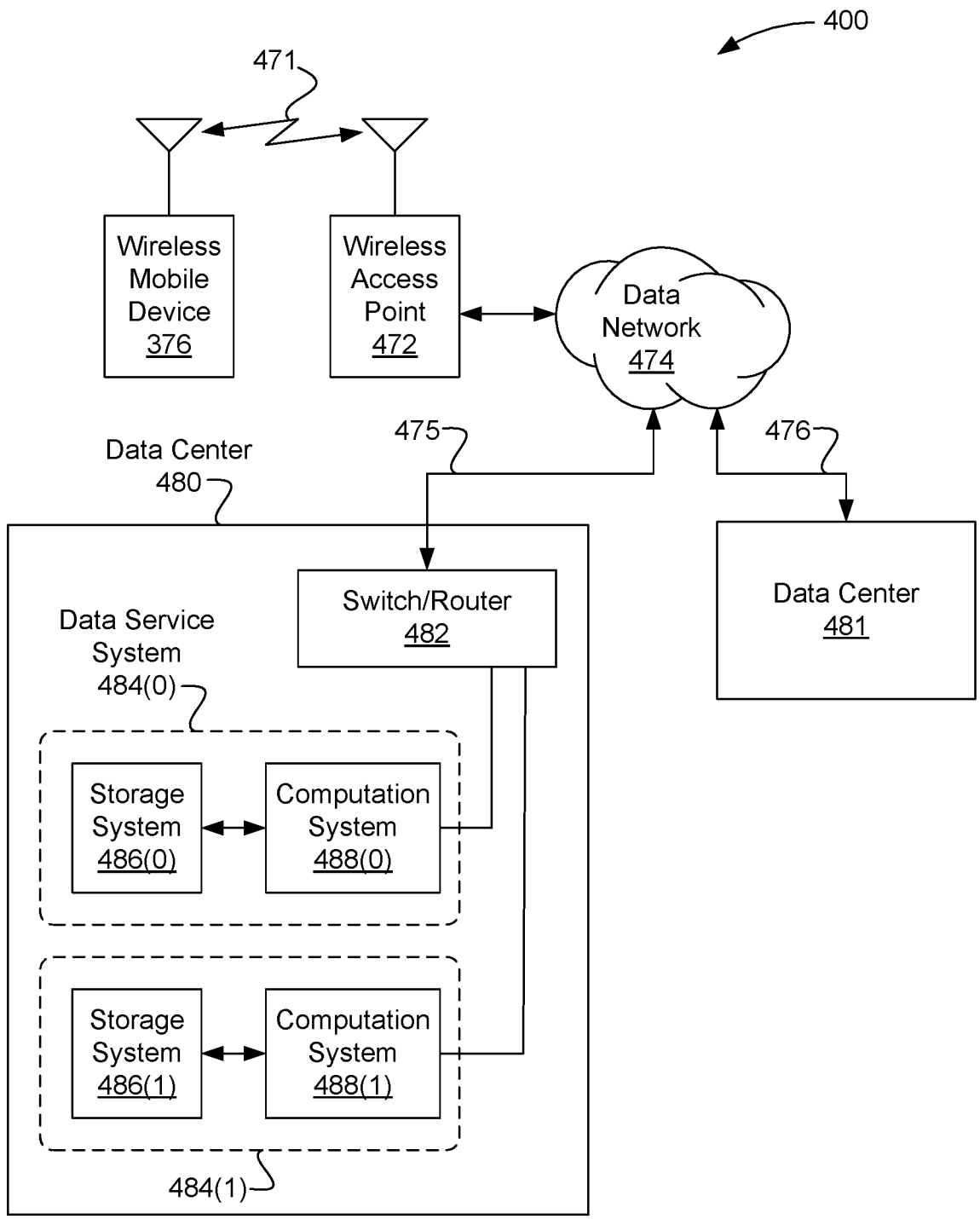
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
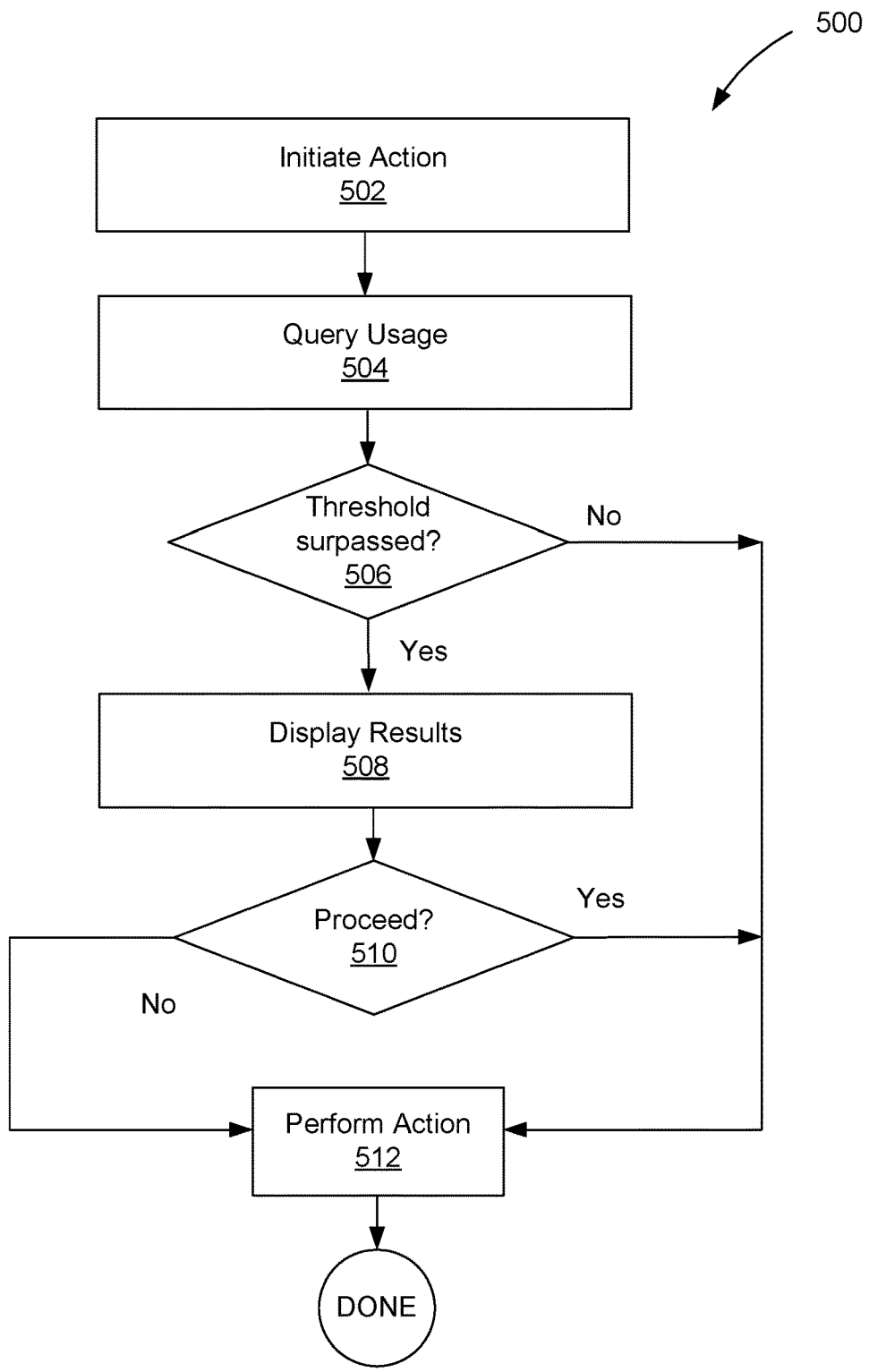
FIG. 5 illustrates a method for determining whether to perform an action, in accordance with another embodiment.

FIG. 5 illustrates a method 500 for determining whether to perform an action, in accordance with another embodiment. As an option, the method 500 may be carried out in the context of the details of any of the Figures. Of course, however, the method 500 may be carried out in any desired environment. Further, the aforementioned definitions may equally apply to the description below.

As shown, an action is initiated. See operation 502. Next, usage is queried. See operation 504. Further, it is determined whether a threshold is surpassed. See decision 506.

In one embodiment, the action may require some amount of bandwidth consumption, thereby necessitating querying for the amount of usage. In various embodiments, the usage may be associated with one or more devices (e.g. single account with single device, single account with multiple devices, etc.).

In another embodiment, the threshold may be imposed by a network carrier. For example, in one embodiment, a mobile plan may include a bandwidth amount of 3 GB per billing cycle (e.g. on a monthly basis, etc.). As such, before initiating the action, it is verified whether the total usage amount may exceed the total bandwidth amount as monitored by the network carrier.

Additionally, in one embodiment, verifying whether a threshold has been surpassed may include verifying whether the devices have thus far surpassed the data limit, or are coming within a set threshold of the limit. In another embodiment, verifying whether a threshold has been surpassed may include verifying whether the total amount thus far in combination with the amount of data needed to perform the action would surpass a data limit.

As shown, if the threshold is not surpassed, the action is performed. See operation 512. However, if the threshold is surpassed, results are displayed. See operation 508. For example, in various embodiments, results being displayed may include providing a screen indicating that performing the action would cause the data usage to come within a set threshold (e.g. within 10%, etc.) of the data limit. In another embodiment, the results being displayed may include providing a screen indicating that the data amount has been surpassed and the action cannot be performed. In certain embodiments, total consumption may be displayed to a user regardless of whether the threshold is surpassed to assist the user in tracking total usage of the account. Various embodiments may implement varying degrees of coherence with respect to usage data stored locally within each device associated with a data plan.

In a separate embodiment, an option may be presented to the user whereby the user may indicate the speed for transferring the data. For example, in one embodiment, the user may not need the data shared as quickly. Therefore, the user may select to share the data on a slower speed (e.g. 2G, 3G, etc.). In one embodiment, the ability to select a speed may be presented if a user has exceeded, or is within a percentage of exceeding, the data usage threshold. For example, the user may elect to transmit data over a "4G" wireless connection (which may provide unlimited data usage under a plan) rather than an LTE wireless connection (which may provide limited data per month).

As shown, it is determined whether to proceed. See decision 510. In one embodiment, an option to select "yes" or "no" may be presented to the user, along with information indicating how much data remains on the account, and how much of the remaining data will be consumed by performing the action. In one embodiment, the user may select to purchase an additional amount of data.

In another embodiment, the action to be performed may be delayed. For example, in one embodiment, it may be determined that the user is within a set amount of time (e.g. 2 days, etc.) until the next billing cycle (and allocation of data, etc.), and may choose to defer the action until the next cycle begins. In this manner, actions to be performed may be queued until a new data allocation becomes available. In a separate embodiment, data becoming available may include determining that the device is connected to a separate network (e.g. without a data restriction, such as a WiFi connection, etc.), thereby allowing the action to be performed without affecting the data threshold and/or usage.

Figure 6:
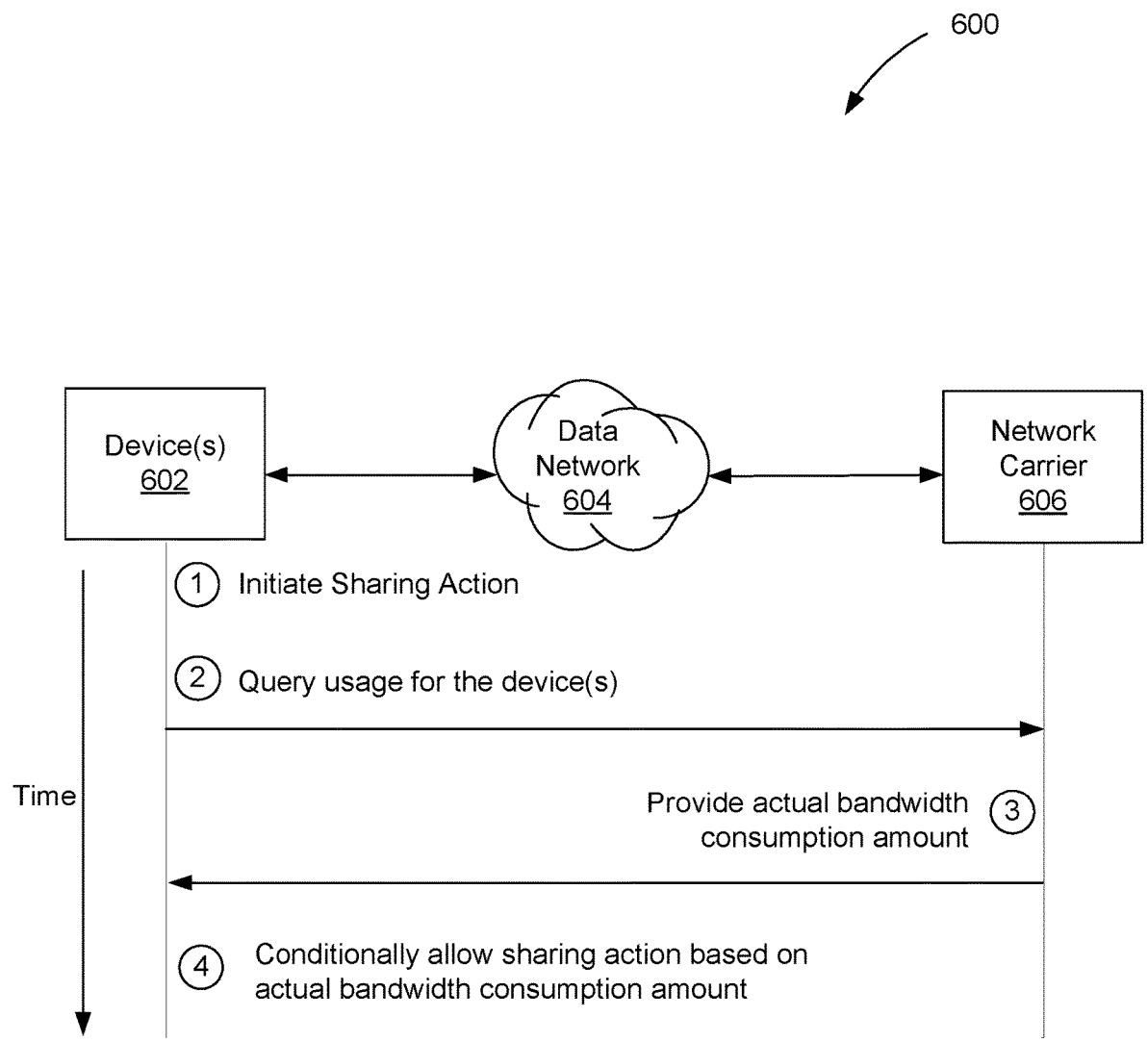
FIG. 6 illustrates a message sequence for determining bandwidth consumption, in accordance with another embodiment.

FIG. 6 illustrates a message sequence 600 for determining bandwidth consumption, in accordance with another embodiment. As an option, the message sequence 600 may be carried out in the context of the details of any of the Figures. Of course, however, message sequence 600 may be carried out in any desired environment. Further, the aforementioned definitions may equally apply to the description below.

As shown, message sequence 600 includes device(s) 602, a data network 604, and a network carrier 606.

At step one, the device initiates a sharing action. Sharing action may be analogous to operation 502 in FIG. 5, the description disclosed herein. At step two, the data usage is queried for the device(s). In one embodiment, the data usage may be associated with two or more devices.

At step three, the network carrier provides actual bandwidth consumption amount. In one embodiment, the actual bandwidth consumption amount may include the total amount of bandwidth consumed associated with the devices on the account. In another embodiment, the actual bandwidth consumption amount may indicate the total adjusted consumption, wherein one or more data items are excluded (e.g. music streaming, etc.) from the complete bandwidth usage.

At step four, the device(s) conditionally allow sharing action based on actual bandwidth consumption amount. In one embodiment, the conditionally allow may be analogous to operation 110 in FIG. 1, the description disclosed herein.

Figure 7:
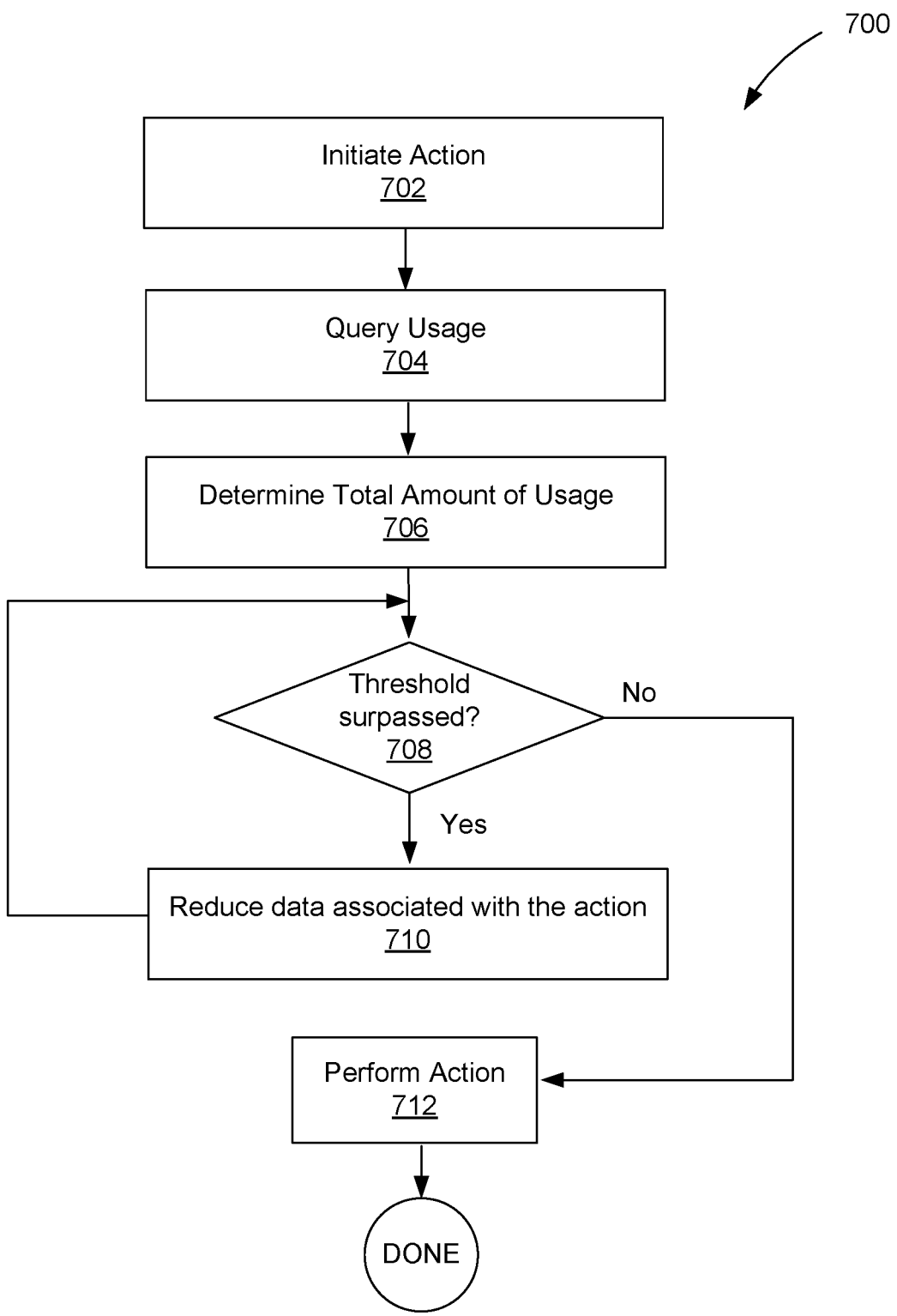
FIG. 7 illustrates a method for reducing data associated with an action, in accordance with another embodiment.

FIG. 7 illustrates a method 700 for reducing data associated with an action, in accordance with another embodiment. As an option, the method 700 may be carried out in the context of the details of any of the Figures. Of course, however, method 700 may be carried out in any desired environment. Further, the aforementioned definitions may equally apply to the description below.

As shown, an action is initiated. See operation 702. Next, usage is queried. See operation 704. Further, a total amount of usage is determined. See operation 706.

In one embodiment, the action may require some amount of bandwidth consumption, thereby necessitating querying for the amount of usage. In various embodiments, the usage may be associated with one or more devices (e.g. single account with single device, single account with multiple devices, etc.).

In another embodiment, the threshold may be imposed by a network carrier. For example, in one embodiment, a mobile plan may include a bandwidth amount of 3 GB per billing cycle (e.g. on a monthly basis, etc.). As such, before initiating the action, it is verified whether the total usage amount may exceed the total bandwidth amount as monitored by the network carrier.

Additionally, in one embodiment, verifying whether a threshold has been surpassed may include verifying whether the devices have thus far surpassed the data limit, or are coming within a set threshold of the limit. In another embodiment, verifying whether a threshold has been surpassed may include verifying whether the total amount thus far (e.g. the first bandwidth consumption of FIG. 1) in combination with the amount of data needed to perform the action (e.g. the second bandwidth consumption of FIG. 1) would surpass a data limit.

As shown, it is determined whether a threshold is surpassed. See decision 708. As shown, if the threshold is not surpassed, the action is performed. See operation 712. However, if the threshold is surpassed, then data associated with the action is reduced. See operation 710. In one embodiment, data may be reduced by decreasing resolution, size, quality, etc. In another embodiment, if data is reduced below a threshold quality (e.g. as indicated by user feedback, etc.), then the action associated with the data may not be performed. In a separate embodiment, a slider may be associated with the data reduction such that moving the slider may balance quality and data. For example, in one embodiment, sliding a slider to the right might increase quality but also increase size associated with the data. Additionally, sliding the slider to the left might decrease quality and decrease size associated with the data. Thus, in this manner, a user may control the quality and data size associated with the action.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a network carrier system, a first sharing request from a first device for one or more data items;
determining, by the network carrier system, that the first sharing request satisfies an exclusion criteria; and
performing, by the network carrier system, the first sharing request,
wherein the first sharing request comprises streaming the one or more data items to the first device,
wherein the one or more data items streamed to the first device in connection with the first sharing request is excluded from a data plan usage calculated by the network carrier system for the first device.

2. The method of claim 1, further comprising transmitting the data plan usage to the first device.

3. The method of claim 2, further comprising transmitting the data plan usage to a second, different device.

4. The method of claim 1, wherein streaming the one or more data items comprises streaming music.

5. The method of claim 1, wherein streaming the one or more data items comprises streaming video.

6. The method of claim 1, wherein streaming the one or more data items comprises streaming chat data.

7. The method of claim 1, wherein the exclusion criteria indicates data associated with a specific device application.

8. The method of claim 1, wherein the exclusion criteria indicates data associated with a preferred video service.

9. The method of claim 1, wherein the exclusion criteria indicates data associated with a preferred music service.

10. The method of claim 1, wherein the exclusion criteria indicates data associated with a specific user.

11. The method of claim 1, wherein the exclusion criteria indicates specific types of data.

12. A device, comprising:
a non-transitory memory storing instructions; and
one or more processors in communication with the non-transitory memory, wherein the one or more processors execute the instructions to:
initiate a first sharing action for one or more data items, wherein the one or more data items satisfy an exclusion criteria;
perform the first sharing action, wherein the first sharing action comprises streaming the one or more data items to the device;
receive a data plan usage as calculated by a network carrier, wherein the data plan usage excludes data usage in connection with the first sharing action.

13. The device of claim 12, wherein streaming the one or more data items comprises streaming music.

14. The device of claim 12, wherein streaming the one or more data items comprises streaming video.

15. The device of claim 12, wherein streaming the one or more data items comprises streaming chat data.

16. The device of claim 12, wherein the exclusion criteria indicates data associated with a specific device application.

17. The device of claim 12, wherein the exclusion criteria indicates data associated with a preferred video service.

18. The device of claim 12, wherein the exclusion criteria indicates data associated with a preferred music service.

19. The device of claim 12, wherein the exclusion criteria indicates data associated with a specific user.

20. A computer program product comprising computer executable instructions stored on a non-transitory computer readable medium that when executed by a processor instruct the processor to:
initiate a first sharing action for one or more data items, wherein the one or more data items satisfy an exclusion criteria;
perform the first sharing action, wherein the first sharing action comprises streaming the one or more data items to a device;
receive a data plan usage as calculated by a network carrier, wherein the data plan usage excludes data usage in connection with the first sharing action.

* * * * *